(12) United States Patent
Ray et al.

(10) Patent No.: US 9,374,756 B1
(45) Date of Patent: Jun. 21, 2016

(54) SECURE WIRELESS DEVICE HANDOFF (71) Applicant: Sprint Communications Company L.P., Overland Park, KS (US)

(72) Inventors: Amar Nath Ray, Shawnee, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 292 days.

(21) Appl. No.: 14/144,006

(22) Filed: Dec. 30, 2013

(51) Int. Cl.
*H04L 29/06* (2006.01)
*H04W 36/24* (2009.01)

(52) U.S. Cl.
CPC .................................... *H04W 36/24* (2013.01)

(58) Field of Classification Search
CPC ....... H04W 4/00; H04W 12/00; H04W 4/003; H04L 65/1016; H04L 65/1073; H04L 65/1069; H04L 29/06; H04L 12/28
USPC ......... 370/218, 238, 252, 259, 329, 331, 352; 455/414.1, 426.1, 433, 452.2; 709/227; 726/27
See application file for complete search history.

(56) References Cited

U.S. PATENT DOCUMENTS

| | | | | |
|---|---|---|---|---|
| 8,725,106 B1* | 5/2014 | Stegall | .............. | H04W 36/0066 455/403 |
| 2012/0124222 A1* | 5/2012 | Noldus | ............... | H04L 61/3085 709/227 |
| 2012/0302234 A1 | 11/2012 | Wallis et al. | | |
| 2013/0044613 A1* | 2/2013 | Edara | .................. | H04W 76/026 370/252 |
| 2014/0204901 A1* | 7/2014 | Hedman | ........... | H04W 36/0022 370/331 |
| 2015/0098462 A1* | 4/2015 | Ku | .................... | H04L 29/06176 370/352 |

FOREIGN PATENT DOCUMENTS

WO    2013050061    4/2013

\* cited by examiner

*Primary Examiner* — Charles C Jiang
*Assistant Examiner* — Wali Butt (57) ABSTRACT

Examples disclosed herein provide systems, methods, and software for rolling over a data communication from one communication network to another. In one example, a wireless communication device may initiate a Voice over Long Term Evolution communication using Long Term Evolution or LTE. However, during the communication, the device may be required to transition to a different communication format such as CDMA2000. In response to this transition, an IP multimedia subsystem is configured to gather information about the subscriber equipment and provide this information to a media gateway controller to transition the communication.

17 Claims, 6 Drawing Sheets

SECURE WIRELESS DEVICE HANDOFF

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchanges, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a Long Term Evolution (LTE) network is deployed over a similar geographic area as a CDMA2000 1× wireless network or other wireless networks.

In some examples, it may be beneficial to handoff data communications from a first network to another overlapping network. Some instances where this may be beneficial include moments when the signal strength of the first network is diminished, the speed of the overlapping network is greater, and the security is better on the overlapping network, amongst other possible beneficial handoff moments. As a result, it is necessary to efficiently, quickly, and securely transition a wireless device from the first network to the second network.

OVERVIEW

Examples disclosed herein provide systems and methods for rolling over a Voice over Long Term Evolution communication from one communication network to another. In one example, a method of transitioning a Voice over Long Term Evolution (VoLTE) communication from Long Term Evolution (LTE) communication format to 1× communication format includes, in a mobile switching center, identifying a transition from the LTE communication format to the 1× communication format for a wireless communication device. The method further provides, in the mobile switching center and in response to identifying the transition, transferring an initial address message to a media gateway controller. The method also includes, in the media gateway controller and in response to the initial address message, transferring a first invitation to an interrogating call session control function to process the transition to the 1× communication format.

The method further comprises, in the interrogating call session control function and in response to the first invitation from the media gateway controller, transferring a query to a home subscriber server for subscriber information and transferring a second invitation to an application server to process the transition to the 1× communication format. Once the invitation is received by the application server, the method provides transferring a third invitation to a serving call session control function to process the transition to the 1× communication format and, in the serving call session control function and in response to receiving the third invitation from the application server, transferring a fourth invitation to the media gateway controller to facilitate the VoLTE communication using the 1× communication format.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless communication devices may provide a user with a variety of different applications and processes that communicate using one or more wireless communication networks. Such applications and processes may include voice calls, email applications, and file sharing applications, amongst other possible applications. In some examples, a wireless device may initiate a communication using a first wireless communication protocol, but may handoff to a second communication protocol based on a network condition. This network condition may include the device moving outside the coverage are for the first communication protocol, the first communication protocol becoming overly congested, or the security becoming compromised on the first communication protocol, amongst a variety of other network conditions.

In one example, a user of the wireless device may initiate a Voice over Long Term Evolution (VoLTE) communication using Long Term Evolution or LTE communication format. During this communication, the wireless device may require a handoff to a 1× communication format, such as Evolution-Data Optimized or CDMA2000 1×, based on a network condition. This handoff requires interaction between the networked devices that provide the initial communication on the LTE network and the networked devices that provide the communication on the 1× network. By communicating with one another, the device may be quickly and securely handed down from the LTE network to the 1× network.

Figure 1:
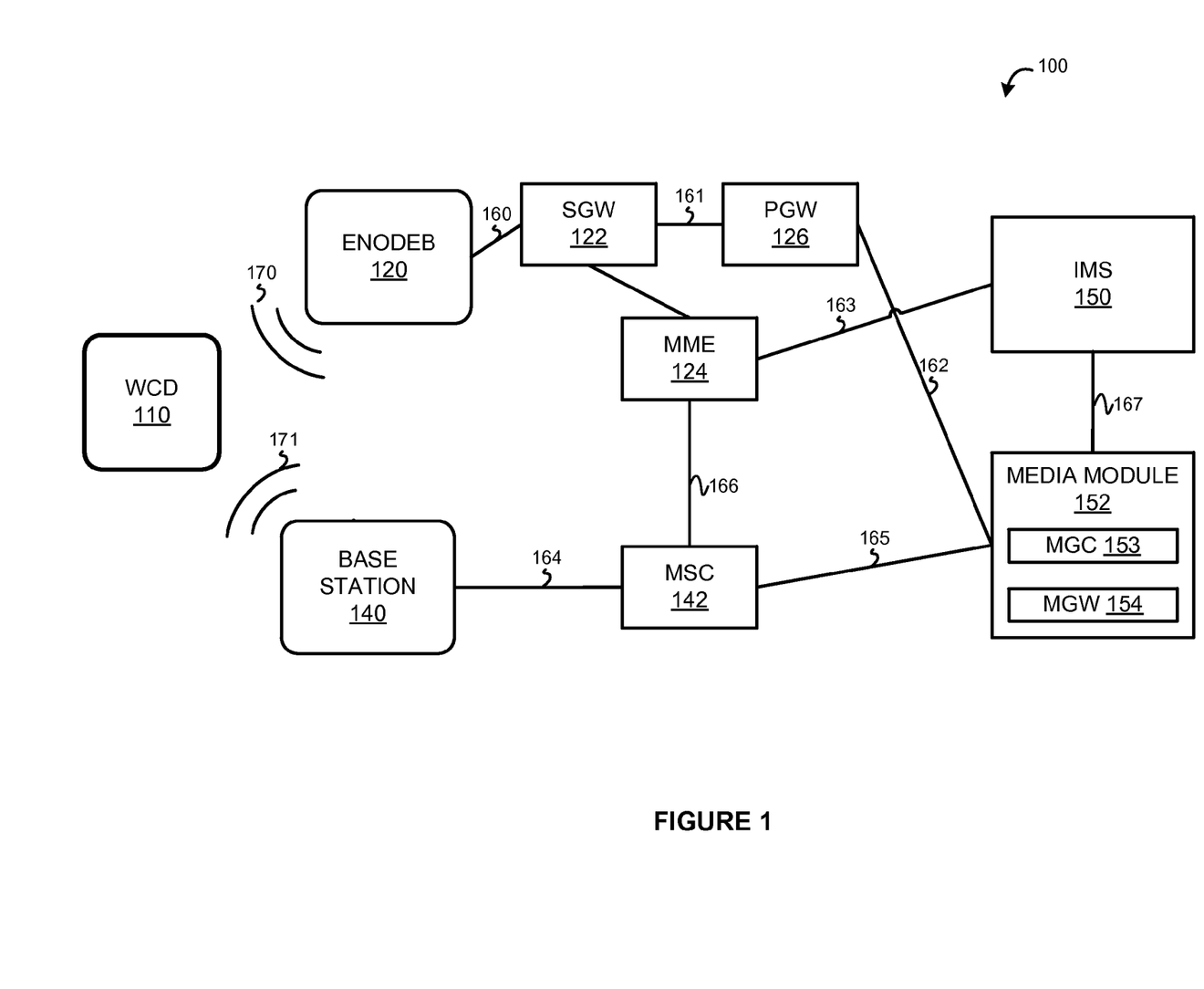
FIG. 1 illustrates a system for Voice over Long Term Evolution handoffs between wireless communication networks.

To further illustrate the VoLTE handoff from LTE communication protocol to 1× communication protocol, FIG. 1 is included. FIG. 1 illustrates a system 100 for handing off a VoLTE communication between wireless networks. System 100 includes wireless communication device (WCD) 110, eNoodeB 120, serving gateway (SGW) 122, mobility management entity (MME) 124, packet data network gateway (PGW) 126, base station 140, mobile switching center (MSC) 142, IP multimedia subsystem (IMS) 150, and media module 152. ENodeB 120, SGW 122, MME 124, and PGW 126 are used to provide WCD 110 with LTE communications. MSC 142 connected to base station 140 may be used to provide 1× communications to WCD 110. IMS 150 is an architectural framework for configuring and delivering IP multimedia services to various wireless devices. In some examples, this multimedia may include VoLTE communications between two or more wireless devices. Media module 152 includes media gateway controller (MGC) 153 and media gateway (MGW) 154 that allow a call from WCD 110 to communicate with other network elements. Communication links 160-167 are used to provide wired or wireless communication between the various elements in system 100. Wireless communication sectors 170-171 are used to provide wireless communications to WCD 110.

In operation, WCD 110 may initiate a VoLTE communication using eNodeB 120, IMS 150, and LTE communication format. In such instances, WCD 110 will communicate data across wireless communication link 170 to eNodeB 120, which will then facilitate access to media module 152 using SGW 122 and PGW 126. Once the VoLTE communication is initiated, WCD 110 may then require a handoff to a 1× communication network that is enabled by base station 140. This handoff may be due to a loss in signal strength for LTE, an increased amount of noise or congestion on eNodeB 120, or any other factor that may cause a transition to 1× communication format.

Once the handoff is required and identified by MSC 142, MSC 142 will then initiate the transition of the VoLTE communication from LTE to 1×. In the present example, MSC 142 is configured to transfer an initial address message (IAM) to MGC 153. MGC 153 is then configured to invite control functions within IMS 150 to handle the transferred communication. Once the communication handoff is processed in IMS 150, IMS 150 will then re-invite MGC 153 to facilitate the 1× communication in the same way that it facilitated the VoLTE communication on the LTE network.

Figure 2:
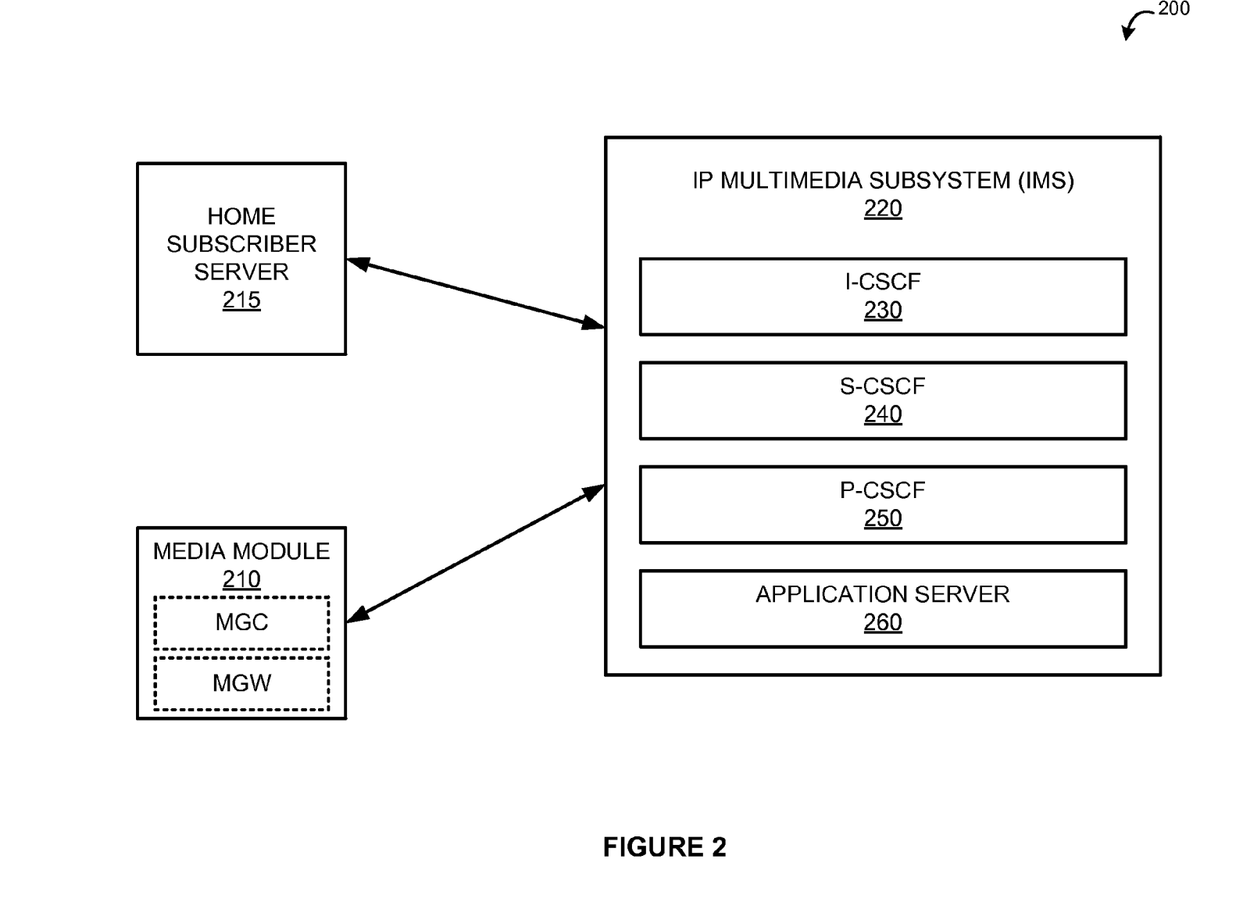
FIG. 2 illustrates an overview for Voice over Long Term Evolution handoffs.

Turning now to FIG. 2, FIG. 2 illustrates an overview 200 of the operation of an IP multimedia subsystem for VoLTE communication handoffs. Overview 200 includes media module 210, home subscriber server 215, and IP multimedia subsystem (IMS) 220. IP multimedia subsystem 220 is an example of IMS 150, although other examples may exist. IP multimedia subsystem 220 further includes interrogating call session control function (I-CSCF) 230, serving call session control function (S-CSCF) 240, proxy call session control function (P-CSCF) 250, and application server 260. Media module 210 further includes a media control function and a media gateway.

I-CSCF 230 is a session initiated protocol (SIP) function that is used to as a forwarding point for SIP packets in a domain. S-CSCF 240 is a SIP server that communicates with home subscriber server 215 to download user profiles that are necessary for the communication of a wireless communication device. P-CSCF 250 is a SIP proxy that is typically used as the first point of contact for the IMS terminal and may be used to provide subscriber authentication. Application server 260 represents a VoLTE application server capable of providing VoLTE services to various wireless communication devices.

In operation, media module 210 may receive an initial address message indicating a VoLTE communication transition from LTE to 1× for a wireless device. Once this message is received, media module 210 may then directly invite I-CSCF 230 to process the transition request. I-CSCF 230 is then configured to determine subscriber information about the wireless device from home subscriber server 215, and request application server 260 to process the 1× communication transition. The subscriber information from home subscriber server 215 may include roaming permissions, charging and billing information, encryption information, and any other relevant information about the requesting user device.

In response to the request from I-CSCF 230, application server 260 is then configured to re-invite S-CSCF 240 to handle the continued VoLTE communication on the 1× network. Upon negotiation of the re-invite from application server 260, S-CSCF 240 is then configured to re-invite the MGC within media module 210 to handle the 1× continuation of the VoLTE communication. In some examples, this re-invitation to media module 210 may include the user or subscriber information that was gathered by home subscriber server 215. The home subscriber information may then be used by media module 210 to ensure the validity of the wireless device making the handoff request.

In some instances, once the communication has been rolled over at media module 210, application server 260 may be configured to terminate the LTE connection for the wireless device. Referring back to FIG. 1 as an example, IMS 150 may be configured to communicate with eNodeB 120 to ensure that the LTE communication is terminated between WCD 110 and eNodeB 120. Once disabled, WCD 110 may then continue the VoLTE communication using 1× communication format and media module 152.

Although illustrated outside of IP multimedia subsystem 220, it should be understood that home subscriber server 215 may be implemented as part of IP multimedia subsystem 220. Further, it should be understood that although IP multimedia subsystem 220 appears as a single module in the present example, IP multimedia subsystem 220 may be implemented on one or more computing or processing systems.

Figure 3:
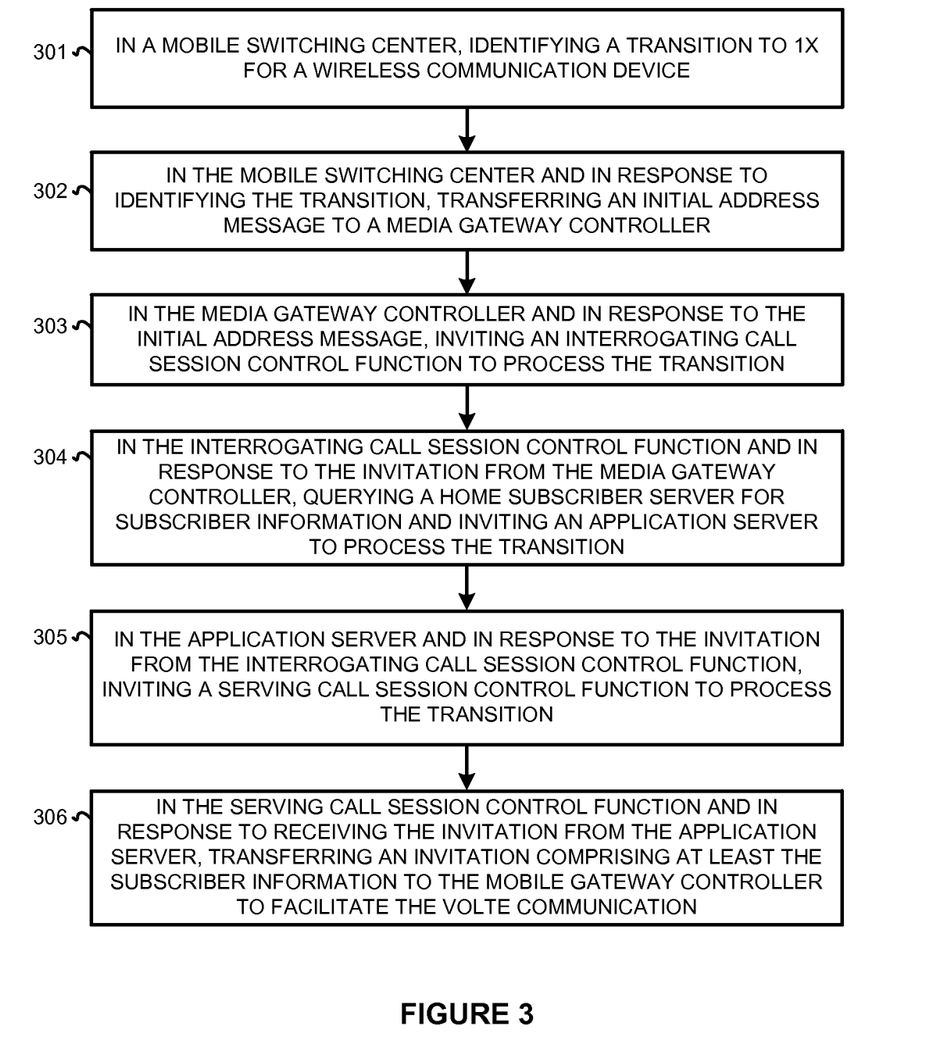
FIG. 3 illustrates a method for Voice over Long Term Evolution handoffs between wireless communication networks.

Referring now to FIG. 3, FIG. 3 illustrates a method of operating a communication system to facilitate a VoLTE communication handoff from LTE communication format to 1× communication format. The method includes, in a mobile switching center, such as MSC 142, identifying a transition to 1× for a wireless communication device (301). In operation, a mobile device, such as WCD 110, may initiate a VoLTE communication using LTE communication format. This communication may use network elements such as eNodeB 120, SGW 122, MME 124, and PGW 126. Once the device or the eNodeB identifies a network condition that requires the device to be handed down to the 1× communication network, a handoff initiation can be delivered from the mobile management entity to the mobile switching center indicating the change requirement.

Once received by the mobile switching center, the mobile switching center is then configured to transfer an initial address message to a media gateway controller (302). In some examples, the media gateway controller is the same controller that was used to provide the VoLTE communication on the LTE communication network. As a result, the media gateway controller is required to transition the call to the 1× communication network.

In response to receiving the initial address message, the media gateway controller is configured to invite the interrogating call session control function (I-CSCF) to process the transition to the 1× communication network (303). Once received, I-CSCF is then configured to initiate the rollover procedures necessary within the IP multimedia subsystem, including inquiring the home subscriber server for information about the mobile device requesting the handoff and requesting the VoLTE application server to process VoLTE transition (304). The information requested from the home subscriber equipment may include roaming permissions, charging and billing information, encryption information, and any other relevant information about the mobile device and the communication.

Upon the VoLTE application server receiving the request, the VoLTE application server will then re-invite the serving call session control function (S-CSCF) to process the transition of the VoLTE communication (305). In some examples, the S-CSCF may be the same control function that was used when the VoLTE communication relied on the LTE communication network. Responsive to this re-invitation, S-CSCF will then transfer an invitation to the mobile gateway controller to facilitate the communication (306).

Figure 4:
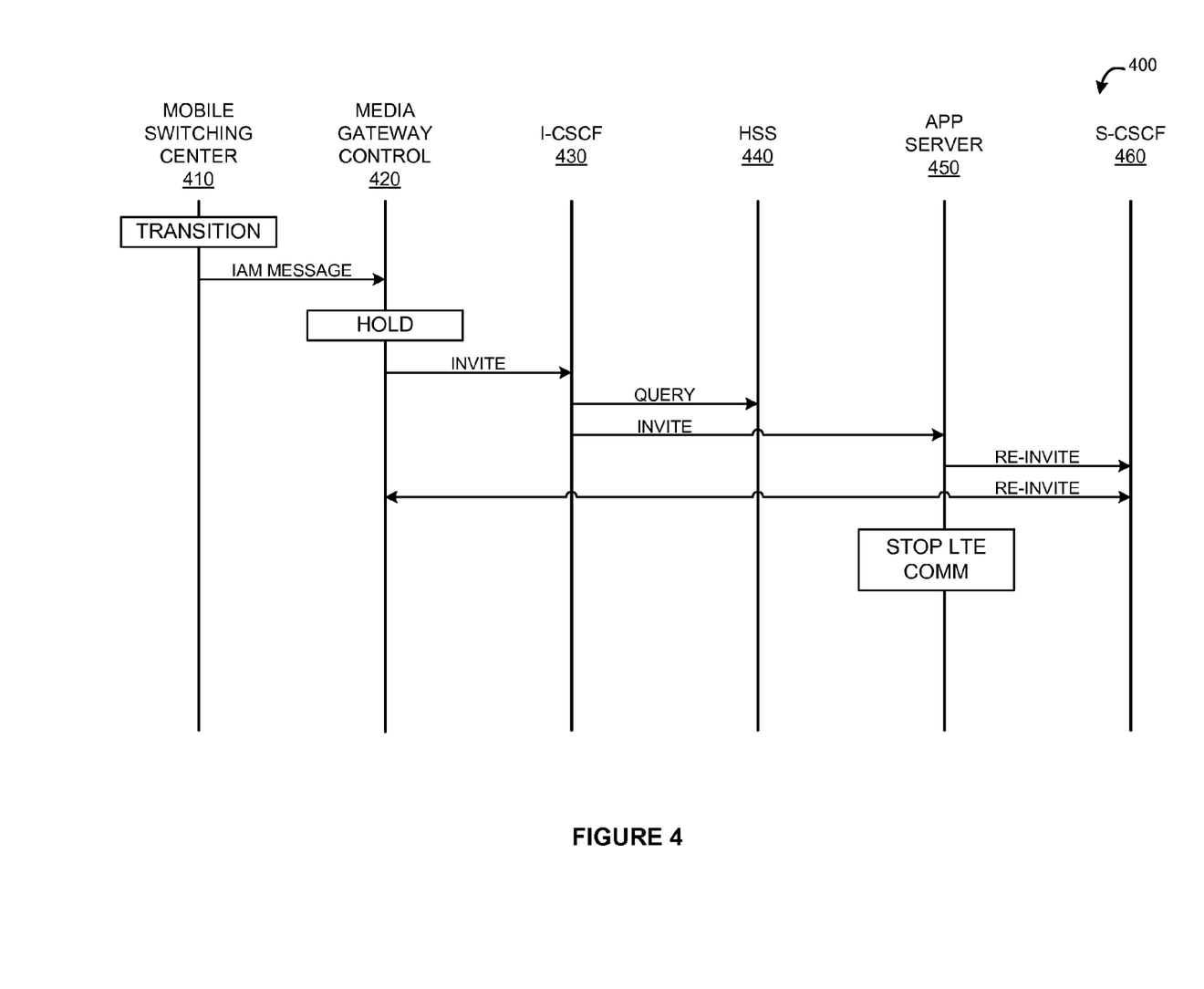
FIG. 4 illustrates a timing diagram for Voice over Long Term Evolution handoffs between communication networks.

Turning now to FIG. 4, FIG. 4 illustrates a timing diagram 400 for transitioning a VoLTE communication from LTE communication format to 1× communication format. Overview 400 includes mobile switching center 410, media gateway controller 420, interrogating call session control function (I-CSCF) 430, home subscriber server (HSS) 440, application server 450, and serving call session control function (S-CSCF) 460.

In operation, mobile switching center 410 will identify a transition from LTE communication format to 1× communication format for a wireless communication device. Once this transition is identified, mobile switching center 410 is configured to transfer an IAM message for delivery to media gateway controller 420. This IAM message is the first message sent to inform the partner switch that a call has been established, in this case, the transition to 1×. In response to the IAM message, media gateway controller 420 is configured to hold the current VoLTE call on the LTE network and invite I-CSCF 430 to assist in the new communication using 1× communication format. Once the invitation is received by I-CSCF 430, I-CSCF is then configured query HSS 440 regarding subscriber information for the call, and invite application server 450 to assist processing the 1× communication. In the present example, application server 450 is configured to act as a VoLTE server with hardware, software, firmware, and any other necessary element to assist in configuring the VoLTE communication.

Upon receipt of the invitation from I-CSCF 430, application server 450 is then configured to re-invite S-CSCF 460 to process the 1× communication. In some examples, S-CSCF 460 is the same serving control function that was used for the communication on the LTE network. As a result, S-CSCF 460 is configured to start managing the 1× communication as well as the LTE communication. Additionally, in response to the invitation from application server 450, S-CSCF 460 is also configured to re-invite media gateway controller 420 to handle the transitioned communication.

In some examples, the re-invitation to media gateway controller 420 may include information that was gathered from HSS 440. Media gateway controller 420 may then use the subscriber information to verify the communication from the wireless communication device, and ensure that the handoff to the 1× communication format is proper.

Once the communication has been configured on media gateway controller 420, application server 450 may then be configured to terminate the LTE communication. This termination may include passing a termination command to each of the control functions responsible for carrying out the communication, including I-CSCF 430 and S-CSCF 460, as well as passing a termination command to the LTE network devices, including the eNodeB, the gateways, and the wireless communication device itself. Upon termination, the device may then be rolled over to the 1× communication format and the VoLTE call may be continued.

Figure 5:
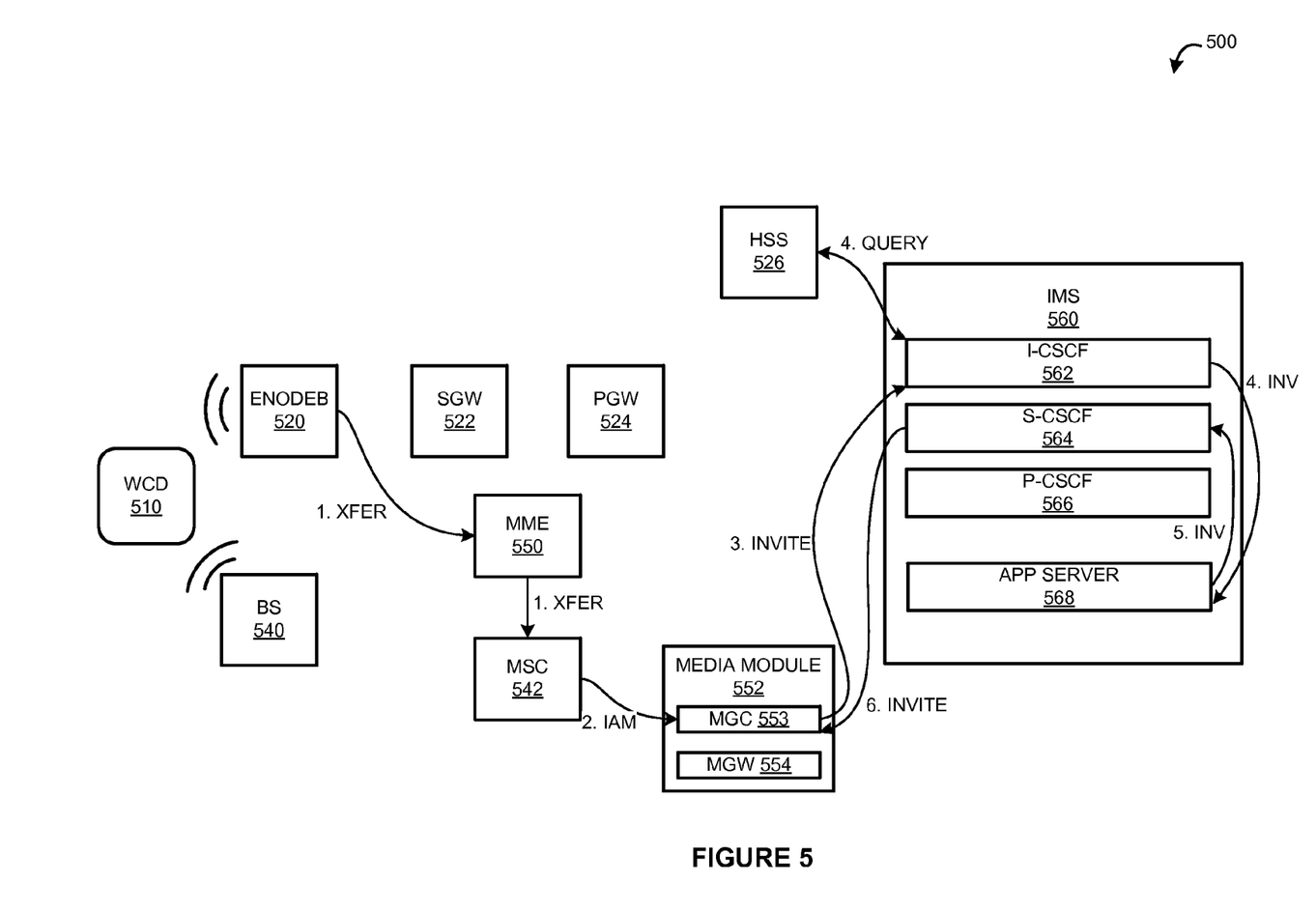
FIG. 5 illustrates an overview for Voice over Long Term Evolution handoffs.

To further illustrate the VoLTE communication handoff from LTE communication format to 1× communication format, FIG. 5 is included. FIG. 5 illustrates an overview 500 of handing off a VoLTE communication from LTE communication format to 1× communication format. Overview 500 includes WCD 510, eNodeB 520, SGW 522, PGW 524, MME 550, BS 540, MSC 542, media module 552, HSS 526, and IMS 560. Media module 552 further includes MGC 553 and MGW 554. IMS 560 further include I-CSCF 562, S-CSCF 564, P-CSCF 566, and application server 568. Although illustrated separately from IMS 560, it should be understood that HSS 526 might be incorporated within IMS 560.

In operation, WCD 510 may initiate a VoLTE communication using the LTE network provided by systems such as eNodeB 520, SGW 522, PGW 524, and MME 550. Once the call is initiated, WCD 510 may then require a handoff to a 1× network that is provided by base station 540. When this occurs, eNodeB 520 or WCD 510 will identify that a transition is required and send a transition initiation request to MME 550, which will then forward the request to MSC 542.

In response to receiving the initiate transfer request, MSC 542 will then transfer an IAM message to MGC 553 on media module 552. This IAM message is the first message sent to inform the partner switch that a call has been established, in this case, the transition to 1×. Once received by MGC 553, MGC 553 will then invite I-CSCF 562 to assist in handling the transitioned call to the 1× communication network. I-CSCF 562 is then configured to, in response to the invite, query HSS 526 for subscriber information about the wireless device making the call, and further to invite application server 568 to process the call on the 1× network.

Upon receipt of the invitation from I-CSCF 562, application server 568 will then invite S-CSCF 564 to process the VoLTE call as it transitions to the 1× communication format. In some examples, S-CSCF 564 may be the same control function that was used when the VoLTE communication was using the LTE communication network. Thus, the invitation to S-CSCF 564 may be a re-invite to handle the communication on the 1× network.

In response to the invitation from application server 568, S-CSCF 564 is then configured to re-invite media gateway controller 553 to process the 1× communication of the VoLTE call. In some instances, the re-invitation may include subscriber information that was gathered from HSS 526. This information may then be used by media module 552 to verify the communication and the rollover from LTE to 1×. After the re-invitation and the verification is complete, media module 552 is able to receive and process communications for WCD 510 across the 1× communication network.

Further, although not illustrated in overview 500, once the 1× communication is configured, application server 568 may be configured to terminate the connections across the LTE communication network. For example, application server 568 may communicate with the various control functions, which in turn will communicate with the various LTE network systems and WCD 510 to cease the LTE communication. Thus, once the LTE communication has been terminated, the only communication that remains is the call across the 1× communication network.

Figure 6:
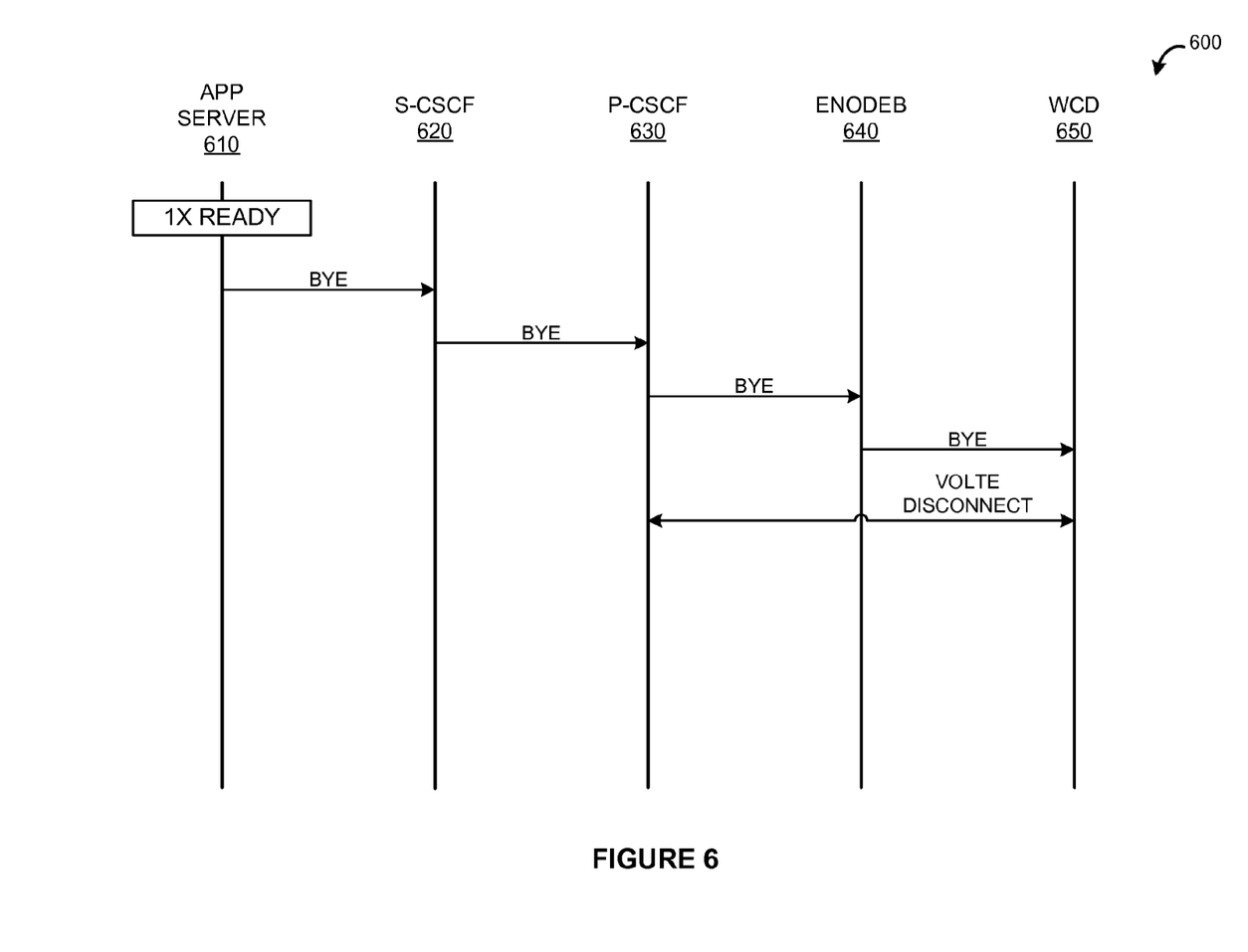
FIG. 6 illustrates a timing diagram for terminating Long Term Evolution communications in a Voice over Long Term Evolution handoff.

To further illustrate the termination of the LTE communication, FIG. 6 is included. FIG. 6 illustrates a timing diagram 600 for terminating LTE communication upon a handoff of a wireless communication device. Timing diagram 600 includes application server 610, S-CSCF 620, P-CSCF 630, eNodeB 640, and wireless communication device 650.

In operation, WCD 650 may initiate a VoLTE communication using LTE and then require a transition down to 1× communication format. Once the communication is ready on the 1× network, the LTE communication links need to be terminated because the device is no longer using the path. As illustrated in FIG. 6, application server 610 is configured to, once the 1× communication is constructed, initiate termination of the LTE communication. In some examples, this may consist of a termination signal that is communicated from application server 610 to S-CSCF 620. In turn, S-CSCF 620 is configured to transfer a termination signal to P-CSCF 630, and P-CSCF 630 is configured to forward the termination signal to eNodeB 640. Once the termination signal is received by eNodeB 640, eNodeB 640 may then terminate the communication with WCD 650. As a result of these termination communications, WCD 650 may then be disconnected from P-CSCF 630.

Returning to FIG. 1, WCD 110 comprises RF communication circuitry and an antenna. The RF communication circuitry typically includes an amplifier, filter, modulator, and signal processing circuitry. WCD 110 may also include a user interface, memory device, software, processing circuitry, or some other communication components. WCD 110 may be a telephone, computer, e-book, mobile Internet appliance, wireless network interface card, media player, game console, or some other wireless communication apparatus.

ENodeB 120 and base station 140 each comprise RF communication circuitry and an antenna. The RF communication circuitry typically includes an amplifier, filter, RF modulator, and signal processing circuitry. ENodeB 120 and base station 140 may each also comprise a router, server, memory device, software, processing circuitry, cabling, power supply, network communication interface, structural support, or some other communication apparatus.

SGW 122, MME 124, PGW 126, MSC 142, IMS 150, and media module 152 may each comprise computer systems and communication interfaces. These devices may also include other components such as a router, server, data storage system, and power supplies. SGW 122, MME 124, PGW 126, MSC 142, IMS 150, and media module 152 may reside in a single device or may be distributed across multiple devices to provide communications to WCD 110.

Wireless sectors 170-171 include wireless links that use the air or space as a transport media. In the present example, wireless sector 170 is used to provide WCD 110 with Long Term Evolution communication format and wireless sector 171 is used to provide WCD 110 with 1× communication format. 1× communication format may include Evolution Data Only (EVDO), CDMA2000, and 1×RTT, amongst other possible 1× communication variations.

Communication links 160-167 use metal, glass, air, space, or some other material as the transport media. Communication links 160-167 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 160-167 could be direct links or may include intermediate networks, systems, or devices The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transitioning a Voice over Long Term Evolution (VoLTE) communication from Long Term Evolution (LTE) communication format to 1× communication format, the method comprising:

in a mobile switching center, identifying a transition from the LTE communication format to the 1× communication format for a wireless communication device;

in the mobile switching center and in response to identifying the transition, transferring an initial address message to a media gateway controller;

in the media gateway controller and in response to the initial address message, holding the VoLTE communication and transferring a first invitation to an interrogating call session control function to process the transition to the 1× communication format;

in the interrogating call session control function and in response to the first invitation from the media gateway controller, transferring a query to a home subscriber server for subscriber information and transferring a second invitation to an application server to process the transition to the 1× communication format;

in the application server and in response to the second invitation from the interrogating call session control function, transferring a third invitation to a serving call session control function to process the transition to the 1× communication format; and in the serving call session control function and in response to receiving the third invitation from the application server, transferring a fourth invitation to the media gateway controller to facilitate the VoLTE communication using the 1× communication format.

2. The method of claim 1 further comprising:

prior to identifying the transition from the LTE communication format to the 1× communication format for the wireless communication device, initiating the VoLTE communication in the wireless communication device using the LTE communication format.

3. The method of claim 1 further comprising:

in the media gateway controller and in response to receiving the fourth invitation from the serving call session control function, re-initiating the VoLTE communication using the 1× communication format.

4. The method of claim 3 further comprising:

in the application server and in response to re-initiating the VoLTE communication, terminating LTE communication links with the wireless communication device.

5. The method of claim 4 wherein terminating the LTE communication links with the wireless communication device comprises at least:

terminating communication between an eNodeB and the wireless communication device.

6. The method of claim 1 wherein identifying the transition from the LTE communication format to the 1× communication format for the wireless communication device comprises receiving a handoff initiation from a mobility management entity.

7. The method of claim 6 wherein the handoff initiation is triggered by an eNodeB.

8. The method of claim 6 wherein the handoff initiation is triggered by the wireless communication device.

9. The method of claim 1 wherein the 1× communication format comprises Evolution-Data Optimized communication format.

10. The method of claim 1 wherein the 1× communication format comprises CDMA2000 communication format.

11. A method of operating a media gateway controller to facilitate a transition of a Voice over Long Term Evolution (VoLTE) communication from Long Term Evolution (LTE) communication format to 1× communication format comprising:
 receiving an initial invitation from an IP multimedia subsystem to initiate the VoLTE communication using the LTE communication format for a wireless communication device;
 receiving an initial address message from a mobile switching center indicating the transition from LTE communication format to 1× communication format for the wireless communication device;
 in response to the initial address message, holding the VoLTE communication and transferring an invitation to an interrogating call session control function to process the transition, wherein the interrogating call session control function transfers a query to a home subscriber server for subscriber information for the wireless communication device and transfers a second invitation to an application server to process the transition to the 1× communication format; and
 receiving a re-invite from a serving call session control function to process the VoLTE communication using 1× communication format, wherein the serving call session control function receives a third invitation from the application server to process the transition and, responsive to the third invitation, transfers the re-invite to the media gateway controller.

12. The method of claim 11 further comprising:
 in response to receiving the re-invite, reinitiating the VoLTE communication using 1× communication format.

13. The method of claim 11 wherein the 1× communication format comprises Evolution-Data Optimized communication format.

14. The method of claim 11 wherein the 1× communication format comprises CDMA2000 communication format.

15. The method of claim 11 wherein the re-invite comprises subscriber information for the wireless communication device.

16. The method of claim 15 wherein the subscriber information is used to verify the wireless communication device.

17. The method of claim 11 wherein the transition occurs in response to a change in network conditions.

* * * * *